United States Patent
Suzuki et al.

(10) Patent No.: US 11,059,463 B2
(45) Date of Patent: Jul. 13, 2021

(54) CONTROL DEVICE DISPLAY INDICATORS FOR ONE-PEDAL FUNCTION AND AUTOMATIC BRAKE HOLD FUNCTION

(71) Applicant: HONDA MOTOR CO., LTD., Tokyo (JP)

(72) Inventors: Noriaki Suzuki, Wako (JP); Yosuke Mizutani, Wako (JP); Fumihiro Nakano, Wako (JP); Keizo Fuke, Wako (JP); Yoshinari Sugita, Wako (JP); Hidetoshi Kobori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 16/577,208

(22) Filed: Sep. 20, 2019

(65) Prior Publication Data
US 2020/0101956 A1   Apr. 2, 2020

(30) Foreign Application Priority Data

Sep. 28, 2018 (JP) .............................. JP2018-184941

(51) Int. Cl.
*B60T 8/1755* (2006.01)
*B60T 8/171* (2006.01)
(Continued)

(52) U.S. Cl.
CPC .......... *B60T 8/17555* (2013.01); *B60T 7/045* (2013.01); *B60T 8/171* (2013.01); *B60T 17/22* (2013.01); *B60W 30/18109* (2013.01)

(58) Field of Classification Search
CPC ...... B60T 8/17555; B60T 8/171; B60T 7/045; B60T 17/22; B60T 2201/06; B60T 7/122;
(Continued)

(56) References Cited

U.S. PATENT DOCUMENTS

| 6,351,701 B2 * | 2/2002 | Minowa | B60K 26/02 701/70 |
| 2004/0099085 A1 * | 5/2004 | Olofsson | B60W 30/18181 74/513 |

(Continued)

FOREIGN PATENT DOCUMENTS

| JP | 2006-335314 A | 12/2006 |
| JP | 2016-34818 A | 3/2016 |

*Primary Examiner* — Sze-Hon Kong
(74) *Attorney, Agent, or Firm* — Thomas | Horstemeyer, LLP

(57) ABSTRACT

A control device configured to control a vehicle is provided. The device comprises: a traveling control unit capable of executing stop hold control in an automatic brake hold function and a one-pedal function; and an output control unit capable of displaying a first indicator indicating that the one-pedal function is enabled and a second indicator indicating that the automatic brake hold function is enabled. The traveling control unit exclusively executes the automatic brake hold function and the one-pedal function. The output control unit executes at least one of ending display of the second indicator and displaying the first indicator when the one-pedal function is enabled instead of the automatic brake hold function and/or ending display of the first indicator and displaying the second indicator when the automatic brake hold function is enabled instead of the one-pedal function.

6 Claims, 4 Drawing Sheets

(51) Int. Cl.
*B60W 30/18* (2012.01)
*B60T 7/04* (2006.01)
*B60T 17/22* (2006.01)

(58) Field of Classification Search
CPC ..... B60W 30/18109; B60W 2050/146; B60W 50/14; B60W 30/18181; B60W 30/182
See application file for complete search history.

(56) References Cited

U.S. PATENT DOCUMENTS

| | | | |
|---|---|---|---|
| 2013/0338894 A1* | 12/2013 | Olofsson | B60T 7/042 701/70 |
| 2016/0236672 A1* | 8/2016 | Yanagida | B60T 8/1755 |
| 2017/0166174 A1* | 6/2017 | Narahara | B60T 8/241 |
| 2017/0259828 A1* | 9/2017 | Yamaoka | B60T 7/042 |
| 2017/0297547 A1* | 10/2017 | Goto | B60T 7/12 |
| 2017/0361851 A1* | 12/2017 | Takeya | B60W 10/30 |
| 2019/0135244 A1* | 5/2019 | Shiozawa | B60T 7/12 |
| 2019/0152386 A1* | 5/2019 | McQuillen | G07C 5/0808 |
| 2020/0047761 A1* | 2/2020 | Tsuda | B60W 30/182 |
| 2020/0355265 A1* | 11/2020 | Elflein | B60L 15/20 |

* cited by examiner

CONTROL DEVICE DISPLAY INDICATORS FOR ONE-PEDAL FUNCTION AND AUTOMATIC BRAKE HOLD FUNCTION

CROSS-REFERENCE TO RELATED APPLICATION(S)

This application claims priority to and the benefit of Japanese Patent Application No. 2018-184941 filed on Sep. 28, 2018, the entire disclosure of which is incorporated herein by reference.

BACKGROUND OF THE INVENTION

Field of the Invention

The present invention relates to a control device, a control method, and a non-transitory computer-readable storage medium.

Description of the Related Art

Japanese Patent Laid-Open No. 2006-335314 proposes an automatic brake hold function of, when a vehicle stops, holding the stop state of the vehicle without depending on the operation amount of a brake pedal. Japanese Patent Laid-Open No. 2016-34818 proposes a one-pedal function of controlling both the driving force and the braking force of a vehicle in accordance with the operation amount of the accelerator pedal of the vehicle and after the stop, holding the stop state of the vehicle without depending on the operation amount of a brake pedal.

SUMMARY OF THE INVENTION

In the case of the vehicle having both the automatic brake hold function and the one-pedal function, for example, the following problem arises. If the user performs an operation of enabling the one-pedal function from a state in which the automatic brake hold function is enabled, and after that, wants to end the stop hold control, the user does not know how to end the stop hold control. According to an aspect of the present invention, the convenience of the user is improved, and the state of the vehicle is notified in an easy-to-understand manner.

In consideration of the above-described problem, a control device configured to control a vehicle is provided. The device comprises: a traveling control unit capable of executing stop hold control in at least two functions including an automatic brake hold function of, in a case in which the vehicle is stopped by depressing a brake pedal, holding a stop state of the vehicle without depending on an operation amount of the brake pedal and a one-pedal function of controlling both a driving force and a braking force of the vehicle in accordance with an operation amount of an accelerator pedal and holding the stop state of the vehicle after the stop without depending on the operation amount of the brake pedal; and an output control unit capable of displaying, on a display device of the vehicle, a first indicator indicating that the one-pedal function is enabled and a second indicator indicating that the automatic brake hold function is enabled. The traveling control unit exclusively executes the automatic brake hold function and the one-pedal function. The output control unit executes at least one of ending display of the second indicator and displaying the first indicator in a case in which a first transition of transitioning from a state in which the automatic brake hold function is enabled to a state in which the one-pedal function is enabled is performed, and/or ending display of the first indicator and displaying the second indicator in a case in which a second transition of transitioning from the state in which the one-pedal function is enabled to the state in which the automatic brake hold function is enabled is performed.

DESCRIPTION OF THE EMBODIMENTS

Figure 1:
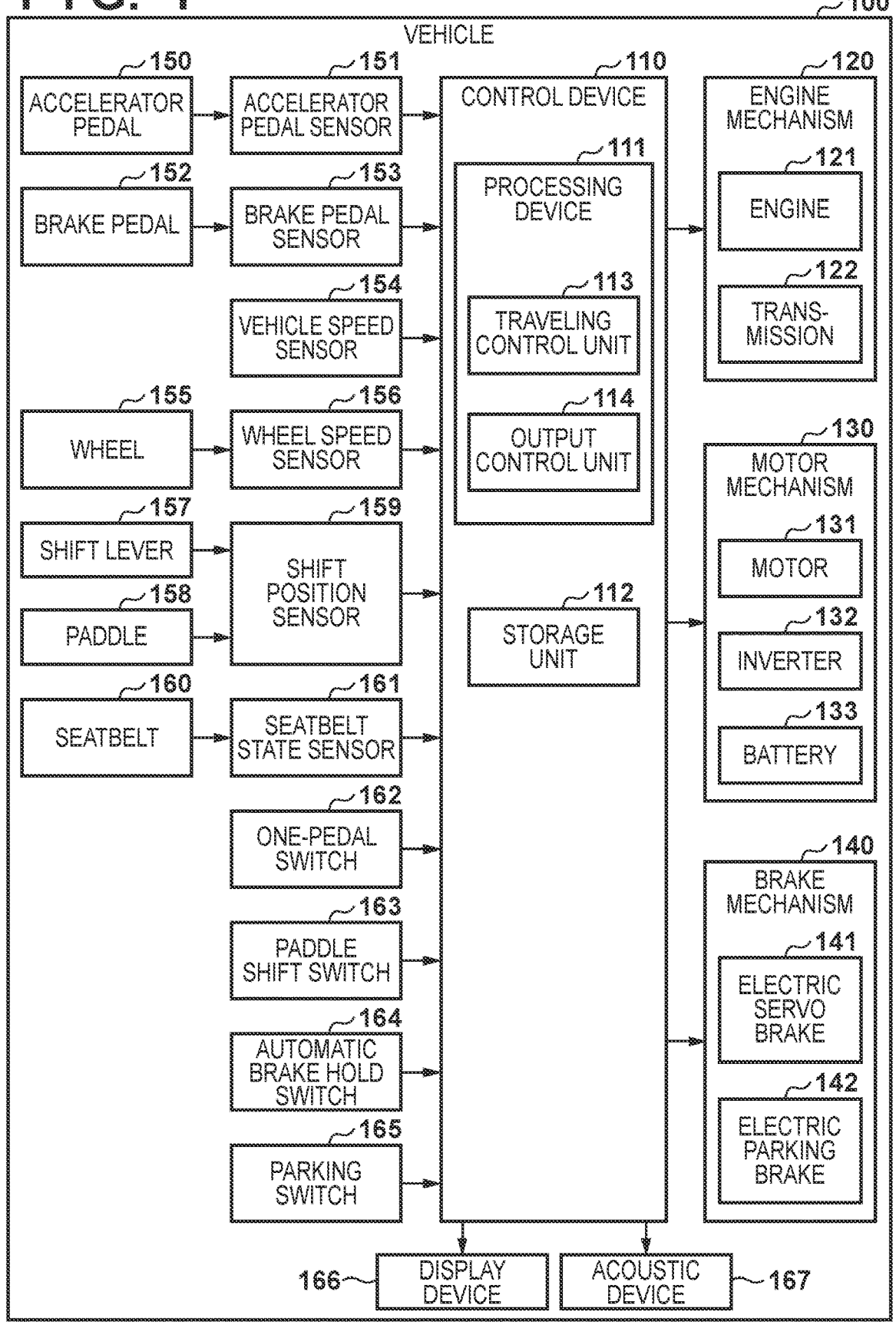
FIG. 1 is a block diagram for explaining an example of the arrangement of a vehicle according to an embodiment of the present invention.

Embodiments of the present invention will now be described with reference to the accompanying drawings. The same reference numerals denote similar elements throughout various embodiments, and a repetitive description will be omitted. In addition, the embodiments can appropriately be changed or combined.

An example of the arrangement of a vehicle 100 according to some embodiments of the present invention will be described with reference to FIG. 1. The vehicle 100 is a vehicle (so-called hybrid vehicle) using both a fossil fuel and electricity as a driving power source. The vehicle 100 may be a vehicle (so-called engine vehicle or diesel vehicle) using only a fossil fuel as the driving power source, or may be a vehicle (so-called electric vehicle) using only electricity as the driving power source or a vehicle (so-called fuel cell vehicle) using hydrogen as the driving power source.

The vehicle 100 includes constituent elements shown in FIG. 1. FIG. 1 mainly shows constituent elements used for the description of the embodiment, and other constituent elements (for example, a vehicle body, a suspension, and the like) of the vehicle 100 are not illustrated. A control device 110 controls the vehicle 100. The control device 110 may be formed as a general-purpose computer including a processing unit 111 and a storage unit 112. The processing unit 111 performs processing for controlling the vehicle 100. The processing unit 111 is formed by, for example, a processor. The storage unit 112 stores programs and data used in the processing by the processing unit 111. The storage unit 112 is formed by, for example, a volatile memory such as a RAM (Random Access Memory) and a nonvolatile memory such as a ROM (Read Only Memory).

The processing unit 111 includes, for example, a traveling control unit 113 and an output control unit 114. The traveling control unit 113 performs control concerning driving and braking of the vehicle 100. The output control unit 114 performs control concerning output of information to a driver. When the processing unit 111 executes a program stored in the storage unit 112, operations by the traveling control unit 113 and the output control unit 114 are performed. The control device 110 may be formed not by a general-purpose computer but by a dedicated integrated circuit (for example, ASIC). In this case, the traveling control unit 113 and the output control unit 114 may be formed by separate integrated circuits.

The control device 110 can also be called an ECU (Electronic Control Unit). The control device 110 may be formed by one ECU or may be formed by a plurality of ECUs. If the control device 110 is formed by a plurality of ECUs, these ECUs are arranged on various places in the vehicle and communicate with each other via an in-vehicle network such as a CAN (Controller Area Network).

An engine mechanism 120 gives a driving force to the vehicle 100 using a fossil fuel (for example, gasoline) as an energy source. The engine mechanism 120 includes an engine 121 and a transmission 122. The engine 121 is the driving source of the vehicle 100 and is controlled by the traveling control unit 113. The transmission 122 is, for example, a CVT (Continuously Variable Transmission). Alternatively, another transmission may be used. The traveling control unit 113 controls the engine mechanism 120, thereby making an engine brake actuate.

A motor mechanism 130 gives a driving force to the vehicle 100 using electricity as an energy source. The motor mechanism 130 includes a motor 131, an inverter 132, and a battery 133. The inverter 132 controls the output of the motor 131. The battery 133 accumulates electric energy and supplies the electric energy to the motor 131 via the inverter 132. The traveling control unit 113 controls the motor mechanism 130, thereby making a regeneration brake actuate.

The brake mechanism 140 gives a braking force to the vehicle 100. The brake mechanism 140 includes an electric servo brake 141 and an electric parking brake 142. The electric servo brake 141 is a brake that makes the regeneration brake by the motor cooperate with a friction brake by a liquid pressure, and gives a braking force according to the operation amount of a brake pedal 152 to the vehicle 100. The electric parking brake 142 gives a stop hold braking force independent of the operation amount of the brake pedal 152 to the rear wheels of the vehicle 100.

An accelerator pedal 150 is a pedal used to receive control of the driving force from the driver. An accelerator pedal sensor 151 detects the depression amount (to be also referred to as an AP operation amount hereinafter) of the accelerator pedal 150, and supplies it to the control device 110. The traveling control unit 113 controls the engine mechanism 120 and the motor mechanism 130 to give a driving force according to the AP operation amount to the vehicle 100.

The brake pedal 152 is a pedal used to receive control of the braking force from the driver. A brake pedal sensor 153 detects the depression amount (to be also referred to as a BP operation amount hereinafter) of the brake pedal 152, and supplies it to the control device 110. The traveling control unit 113 controls the electric servo brake 141 to give a braking force according to the BP operation amount to the vehicle 100.

A vehicle speed sensor 154 detects the vehicle speed of the vehicle 100, and supplies it to the control device 110. A wheel speed sensor 156 detects the rotation speed of a wheel 155, and supplies it to the control device 110. A shift position sensor 159 detects the position of a shift lever 157, and supplies it to the control device 110. In addition, the shift position sensor 159 detects an input using a paddle 158, and supplies it to the control device 110. Note that the paddle is provided, for example, on the periphery of a steering. The input using the paddle 158 includes a shift down instruction and a shift up instruction. A seatbelt state sensor 161 detects the attachment state of a seatbelt 160, and supplies it to the control device 110.

The traveling control unit 113 may be able to execute a one-pedal function. The one-pedal function is a function of controlling both the driving force and the braking force of the vehicle 100 in accordance with the AP operation amount. By the one-pedal function, the traveling control unit 113 may hold the stop state of the vehicle 100 after the stop without depending on the BP operation amount. For example, the traveling control unit 113 gives a braking force according to the AP operation amount to the vehicle 100 when the AP operation amount falls within the range of 0% to 30%, and gives a driving force according to the AP operation amount to the vehicle 100 when the AP operation amount falls within the range of 30% to 100%. The AP operation amount as the boundary between the braking force and the driving force can be set within the range of, for example, 20% to 40%. The traveling control unit 113 may change the value of the boundary in accordance with the vehicle speed.

The effect degree of the braking force according to the AP operation amount can be set from a plurality of levels via the shift lever 157 or the paddle 158. For example, the effect degree of the braking force can be set to each level from level 0 (the braking force is zero) to the upper limit level. The settable upper limit level can change depending on the remaining amount of the battery 133, the temperature of the battery 133, the temperature of the brake pad, the rotation speed of the engine 121, the rotation sped of the transmission 122, and the like. The maximum value of the upper limit level is, for example, level 6. The traveling control unit 113 may change the setting of the effect degree of the braking force not only in accordance with an instruction from the driver but also automatically without an instruction from the driver.

A one-pedal switch 162 is a switch used by the driver to perform switching between the enable state and the disable state of the one-pedal function. This switch may be formed by a physical button, or may be formed by a virtual button displayed on a touch panel. The one-pedal switch 162 is arranged on, for example, an instrument panel.

In a state in which the one-pedal function is disabled, the traveling control unit 113 may execute a paddle shift function. The paddle shift function is a function of changing, in accordance with an instruction from the driver via the shift lever 157 or the paddle 158, the effect degree of the braking force of the vehicle 100 in a case in which the AP operation amount is equal to or less than a traveling resistance. The effect degree of the braking force is changed by, for example, switching the change gear ratio of the transmission 122, adjusting the regeneration amount of the motor mechanism 130, adjusting the engine braking amount, or adjusting a pressure on the brake pad.

The effect degree of the braking force during the enable state of the paddle shift function can be set from a plurality of levels via the paddle 158. For example, the effect degree of the braking force can be set to each level from level 0 (the braking force is zero) to the upper limit level. The settable upper limit level can change depending on the charge state of the battery 133, and the like. The maximum value of the upper limit level is, for example, level 4. The traveling control unit 113 may change the setting of the effect degree of the braking force not only in accordance with an instruction from the driver but also automatically without an instruction from the driver.

A paddle shift switch 163 is a switch used by the driver to perform switching between the enable state and the disable state of the paddle shift function. This switch may be formed by a physical button, or may be formed by a virtual button displayed on a touch panel. The paddle shift switch 163 is arranged on, for example, the instrument panel.

The traveling control unit 113 may be able to execute an automatic brake hold function. The automatic brake hold function is a function of, in a case in which the vehicle 100 is stopped by depressing the brake pedal 152, holding the stop state of the vehicle 100 without depending on the BP operation amount after that (even if the foot is separated from the brake pedal 152). In the enable state of the automatic brake hold function, even if the driver separates the foot from the brake pedal 152 during the stop of the vehicle 100, the stop state of the vehicle 100 is held. The stop state is canceled when the driver depresses the accelerator pedal 150 to change the AP operation amount to a positive value.

An automatic brake hold switch 164 is a switch used by the driver to perform switching between the enable state and the disable state of the automatic brake hold function. This switch may be formed by a physical button, or may be formed by a virtual button displayed on a touch panel. The automatic brake hold switch 164 is arranged on, for example, the instrument panel.

A parking switch 165 is a switch used by the driver to instruct the start and end of actuation of the electric parking brake 142. This switch may be formed by a physical button, or may be formed by a virtual button displayed on a touch panel. The parking switch 165 is arranged on, for example, the instrument panel.

The traveling control unit 113 exclusively executes the automatic brake hold function and the one-pedal function. That is, both the automatic brake hold function and the one-pedal function are never enabled simultaneously. In addition, the traveling control unit 113 exclusively executes the paddle shift function and the one-pedal function. That is, both the paddle shift function and the one-pedal function are never enabled simultaneously.

A display device 166 is a device configured to present visual information to the driver. The display device 166 is formed by, for example, a liquid crystal display, an LED, a meter, or the like. An acoustic device 167 is a device configured to present auditory information to the driver. The acoustic device 167 is formed by, for example, a speaker. The display device 166 and the acoustic device 167 are arranged on, for example, the instrument panel. In this specification, notifications to the driver include a notification using only visual information, a notification using only auditory information, and a notification using both visual information and auditory information. For example, when notifying the driver of a message, the output control unit 114 may display the message as visual information on the display device 166, may reproduce the message as auditory information by the acoustic device 167, or may make both notifications.

Figure 2:
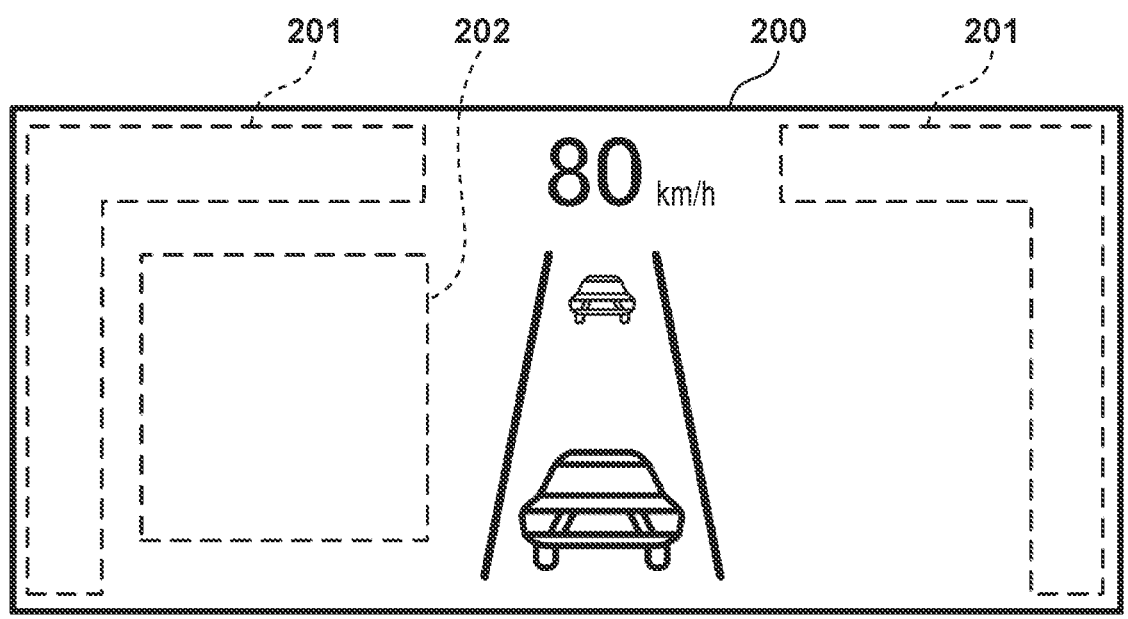
FIG. 2 is a schematic view for explaining an example of the arrangement of a screen according to the embodiment of the present invention.

An example of a screen 200 displayed on the display device 166 will be described with reference to FIG. 2. The screen 200 includes an indicator display region 201 and a message display region 202. Various indicators concerning the state of the vehicle are displayed in the indicator display region 201. A message to the driver is displayed in the message display region 202. In the example shown in FIG. 2, the indicator display regions 201 are arranged on both the left and right sides along the edge of the screen 200.

Examples of indicators that the output control unit 114 can display on the display device 166 will be described with reference to FIGS. 3A to 3E. Each of regions 301, 304, and 307 shown in FIGS. 3A to 3E is a region used to display one indicator, and occupies part of the indicator display region 201. The region 301 and the region 304 may be adjacent to each other. Here, "two regions are adjacent" means that a region used to display another indicator does not exist between the two regions.

Figure 3A:
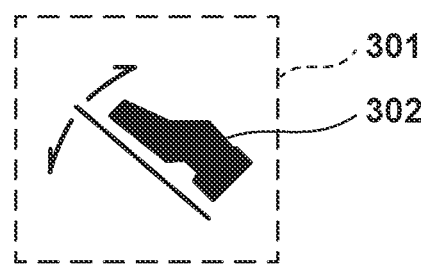
FIGS. 3A to 3E are views for explaining examples of display of indicators according to the embodiment of the present invention.

A one-pedal indicator 302 shown in FIG. 3A is an indicator representing that the one-pedal function is enabled. The one-pedal indicator 302 is arranged in the region 301. The one-pedal indicator 302 is displayed when the one-pedal function is enabled, and is not displayed when the one-pedal function is disabled.

Figure 3B:
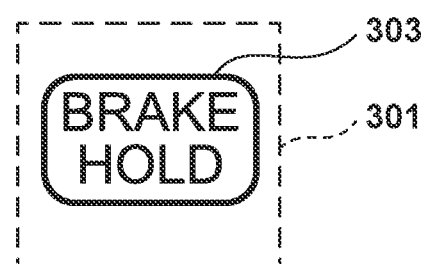

An automatic brake hold indicator 303 shown in FIG. 3B is an indicator representing that the automatic brake hold function is enabled. The automatic brake hold indicator 303 is arranged in the region 301. The automatic brake hold indicator 303 is displayed when the automatic brake hold function is enabled, and is not displayed when the automatic brake hold function is disabled.

Since the automatic brake hold function and the one-pedal function are exclusively executed, the output control unit 114 can exclusively display the one-pedal indicator 302 and the automatic brake hold indicator 303 in the same region 301 of the display device 166. By exclusively displaying the indicators in this way, the screen 200 can effectively be used.

Figure 3C:
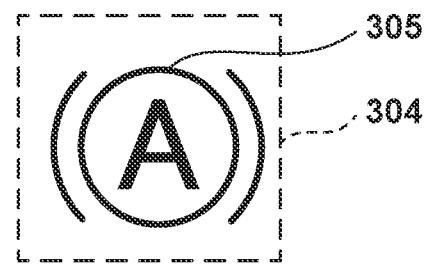

A stop hold indicator 305 shown in FIG. 3C is an indicator representing that the stop state of the vehicle 100 is held by the braking force of the one-pedal function. The stop hold indicator 305 is arranged in the region 304. The stop hold indicator 305 is displayed when stop hold is performed, and is not displayed when stop hold is not performed. However, the stop hold indicator 305 may not be displayed even if stop hold is performed.

Figure 3D:
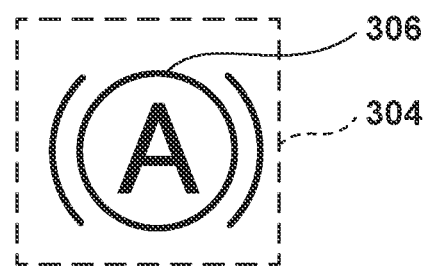

A stop hold indicator 306 shown in FIG. 3D is an indicator representing that the stop state of the vehicle 100 is held by the automatic brake hold function. The stop hold indicator 306 is arranged in the region 304. The stop hold indicator 306 is displayed when stop hold is performed, and is not displayed when stop hold is not performed.

Since the automatic brake hold function and the one-pedal function are exclusively executed, the output control unit 114 can exclusively display the stop hold indicator 305 and the stop hold indicator 306 in the same region 304 of the display device 166. By exclusively displaying the indicators in this way, the screen 200 can effectively be used. In addition, the stop hold indicator 305 and the stop hold indicator 306 are the same mark. Although the functions that cause the display of these indicators are different from each other, the indicators represent the same state in which stop hold of the vehicle 100 is performed. Hence, when the same mark is used, the driver can easily grasp the state of the vehicle 100.

Figure 3E:
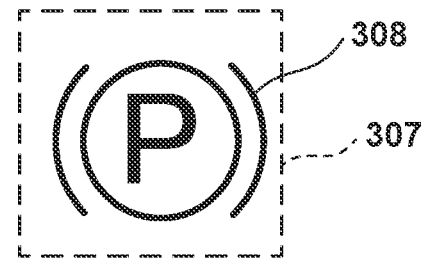

A parking indicator 308 shown in FIG. 3E is an indicator representing that the actuation of the electric parking brake 142 is completed. The parking indicator 308 is arranged in the region 307. The parking indicator 308 is displayed when the actuation of the electric parking brake 142 is completed, and is not displayed when the actuation of the electric parking brake 142 is not completed.

Figure 4:
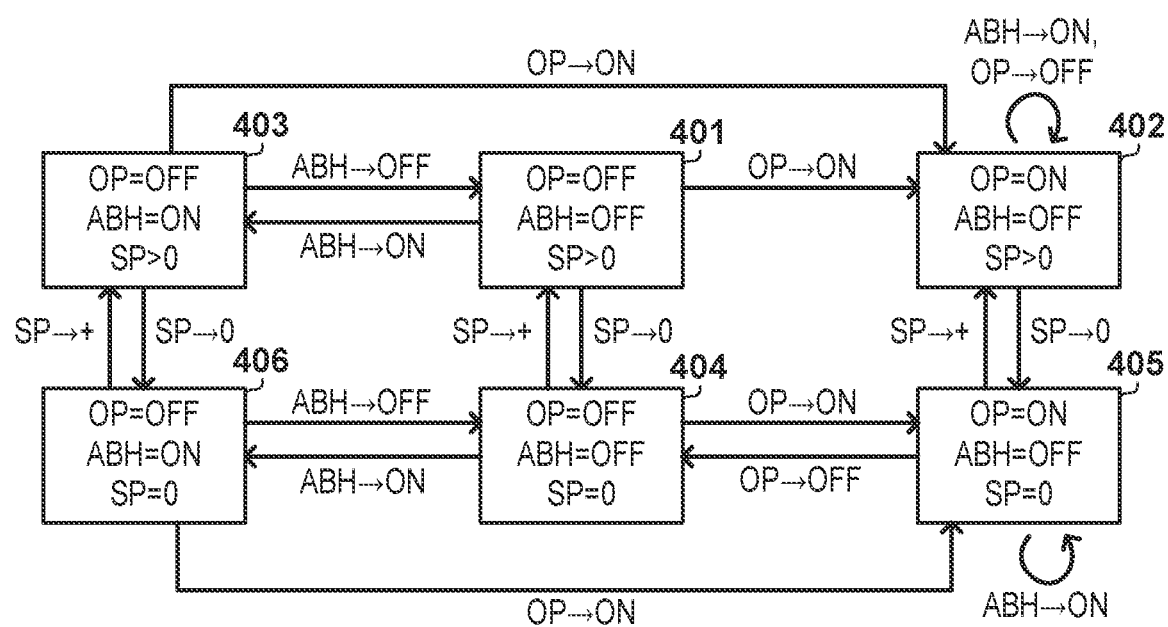
FIG. 4 is a state transition diagram for explaining the operation of a control device according to the embodiment of the present invention.

An example of control of the one-pedal function and the automatic brake hold function by the control device 110 will be described with reference to FIG. 4. In the states shown in FIG. 4, "OP" represents the state of the one-pedal function. "ABH" represents the state of the automatic brake hold function. "SP" represents the vehicle speed. "ON" represents that the target function is enabled. "OFF" represents that the target function is disabled.

Each state will be described first. In a state 401, the one-pedal function is disabled, the automatic brake hold function is disabled, and the vehicle speed is positive (that is, the vehicle 100 is traveling). In the state 401, the output control unit 114 does not display the one-pedal indicator 302, the automatic brake hold indicator 303, the stop hold indicator 305, and the stop hold indicator 306.

In a state 402, the one-pedal function is enabled, the automatic brake hold function is disabled, and the vehicle speed is positive. In the state 402, the output control unit 114 displays the one-pedal indicator 302, and does not display the automatic brake hold indicator 303, the stop hold indicator 305, and the stop hold indicator 306.

In a state 403, the one-pedal function is disabled, the automatic brake hold function is enabled, and the vehicle speed is positive. In the state 403, the output control unit 114 displays the automatic brake hold indicator 303, and does not display the one-pedal indicator 302, the stop hold indicator 305, and the stop hold indicator 306.

In a state 404, the one-pedal function is disabled, the automatic brake hold function is disabled, and the vehicle speed is zero (that is, the vehicle 100 is in the stop state). In this state, the stop state of the vehicle 100 is held by the braking force of the brake pedal 152 by the driver. In the state 404, the output control unit 114 does not display the one-pedal indicator 302, the automatic brake hold indicator 303, the stop hold indicator 305, and the stop hold indicator 306.

In a state 405, the one-pedal function is enabled, the automatic brake hold function is disabled, and the vehicle speed is zero. In this state, even if the BP operation amount is zero, the stop state of the vehicle 100 is held by the braking force of the one-pedal function. In the state 405, the output control unit 114 displays the one-pedal indicator 302 and the stop hold indicator 305, and does not display the automatic brake hold indicator 303 and the stop hold indicator 306.

In a state 406, the one-pedal function is disabled, the automatic brake hold function is enabled, and the vehicle speed is zero. In this state, after the driver depresses the brake pedal 152, even if the BP operation amount is zero, the stop state of the vehicle 100 is held by the braking force of the automatic brake hold function. In the state 406, the output control unit 114 displays the automatic brake hold indicator 303 and the stop hold indicator 306, and does not display the one-pedal indicator 302 and the stop hold indicator 305.

The state transition will be described next. In the state 401, upon receiving an instruction to enable the one-pedal function from the driver, the traveling control unit 113 transitions to the state 402. In accordance with this transition, the output control unit 114 displays the one-pedal indicator 302. In the state 401, upon receiving an instruction to enable the automatic brake hold function from the driver, the traveling control unit 113 transitions to the state 403. In accordance with this transition, the output control unit 114 displays the automatic brake hold indicator 303. In the state 401, when the vehicle speed changes to zero, the traveling control unit 113 transitions to the state 404. The display of indicators is not changed by this transition.

In the state 402, even if an instruction to disable the one-pedal function is received, the traveling control unit 113 does not transition to the state 401 and remains in the state 402. This can prevent the deceleration force from decreasing during traveling and improve the safety of the driver. In this case, the output control unit 114 may notify the driver that it is impossible to disable the one-pedal function during traveling.

In the state 402, upon receiving an instruction to enable the automatic brake hold function from the driver, the traveling control unit 113 remains in the state 402. In this case, the output control unit 114 notifies the driver that it is impossible to enable the automatic brake hold function. This notification is made by, for example, displaying a message in the message display region 202. If transition from a state in which the one-pedal function is enabled to a state in which the automatic brake hold function is enabled can occur, the one-pedal function is disabled, and therefore, the braking force given to the vehicle 100 lowers. For this reason, the traveling control unit 113 does not perform such transition. Additionally, if transition is simply inhibited, the driver cannot grasp the situation. Hence, the output control unit 114 notifies a message representing this.

In the system that exclusively executes the one-pedal function and the automatic brake hold function, with this arrangement, the driver cannot execute the automatic brake hold function when the one-pedal function is active. This can prevent a situation in which when the driver releases the accelerator pedal, the one-pedal function is stopped, and no braking force is generated although it is required to generate the braking force, and can improve the safety. In addition, since the message representing that the automatic brake hold function cannot be enabled is displayed, the driver can grasp the vehicle state, and it is possible to provide a sense of easiness that the automatic brake hold function has no fault.

In the state 402, if the vehicle speed changes to zero, the traveling control unit 113 transitions to the state 405. In accordance with this transition, the output control unit 114 displays the stop hold indicator 305.

In the state 403, upon receiving an instruction to enable the automatic brake hold function from the driver, the traveling control unit 113 transitions to the state 401. In accordance with this transition, the output control unit 114 ends the display of the automatic brake hold indicator 303.

In the state 403, upon receiving an instruction to enable the one-pedal function from the driver, the traveling control unit 113 transitions to the state 402. In accordance with this transition, the output control unit 114 ends the display of the automatic brake hold indicator 303, and displays the one-pedal indicator 302. When the automatic brake hold indicator 303 is not displayed, the driver can grasp that the automatic brake hold function is automatically disabled. In addition, since the one-pedal indicator 302 is displayed, the driver can grasp that stop hold is performed without the operation of the brake pedal 152.

In the state 403, if the vehicle speed changes to zero, the traveling control unit 113 transitions to the state 405. In accordance with this transition, the output control unit 114 displays the stop hold indicator 306.

The transitions from the states 404 to 406 to the states 401 to 403 are the same as the transitions from the states 401 to 403, and a description thereof will be omitted.

In the above-described example, the traveling control unit 113 transitions from the state in which the automatic brake hold function is enabled to the state in which the one-pedal function is enabled, but does not transition from the state in which the one-pedal function is enabled to the state in which the automatic brake hold function is enabled. Instead, the traveling control unit 113 may transition from the state in which the automatic brake hold function is enabled to the state in which the one-pedal function is enabled, and may transition from the state in which the one-pedal function is enabled to the state in which the automatic brake hold function is enabled. Furthermore, the traveling control unit 113 may not transition from the state in which the automatic brake hold function is enabled to the state in which the one-pedal function is enabled, and may transition from the state in which the one-pedal function is enabled to the state in which the automatic brake hold function is enabled. When transitioning from the state in which the one-pedal function is enabled to the state in which the automatic brake hold function is enabled, the output control unit 114 may end the display of the indicator 302 and display the indicator 303.

Summary of Embodiment

[Arrangement 1]

There is provided a control device (110) configured to control a vehicle (100), the device comprising:
- a traveling control unit (113) capable of executing stop hold control in at least two functions including an automatic brake hold function of, in a case in which the vehicle (100) is stopped by depressing a brake pedal (152), holding a stop state of the vehicle without depending on an operation amount of the brake pedal and a one-pedal function of controlling both a driving force and a braking force of the vehicle in accordance with an operation amount of an accelerator pedal (150) and holding the stop state of the vehicle after the stop without depending on the operation amount of the brake pedal; and
- an output control unit (114) capable of displaying, on a display device (166) of the vehicle, a first indicator (302) indicating that the one-pedal function is enabled and a second indicator (303) indicating that the automatic brake hold function is enabled,
- wherein the traveling control unit exclusively executes the automatic brake hold function and the one-pedal function, and
- the output control unit executes at least one of
  - ending display of the second indicator and displaying the first indicator in a case in which a first transition of transitioning from a state in which the automatic brake hold function is enabled to a state in which the one-pedal function is enabled is performed, and/or
  - ending display of the first indicator and displaying the second indicator in a case in which a second transition of transitioning from the state in which the one-pedal function is enabled to the state in which the automatic brake hold function is enabled is performed.

According to this arrangement, both the automatic brake hold function and the one-pedal function are not executed simultaneously, and the functions are exclusively executed. For this reason, if the user wants to end the stop hold control, one of the functions is ended without ending both of the two functions, thereby ending the stop hold control. Hence, the convenience of the user improves.

In addition, since the first indicator or the second indicator is exclusively displayed, it is possible to notify the driver which one of the automatic brake hold function and the one-pedal function should be ended to end the stop hold control.

[Arrangement 2]

There is provided the control device according to arrangement 1, wherein the output control unit exclusively displays the first indicator and the second indicator in the same region (301) of the display device.

According to this arrangement, it is possible to effectively use the screen and also notify the driver which function should be ended to end the stop hold control such that the driver can more easily understand it.

[Arrangement 3]

There is provided the control device according to arrangement 1 or 2, wherein the output control unit can further display, on the display device, a third indicator (305) indicating that the stop state of the vehicle is held by the braking force of the one-pedal function, and a fourth indicator (306) indicating that the stop state of the vehicle is held by the automatic brake hold function,
- the output control unit exclusively displays the third indicator and the fourth indicator in the same region (304) of the display device, and
- the third indicator and the fourth indicator are the same mark.

According to this arrangement, it is possible to effectively use the screen. Furthermore, since the same mark is used, the driver can easily grasp that stop hold is performed.

[Arrangement 4]

There is provided the control device according to any one of arrangements 1 to 3, wherein the traveling control unit performs the first transition and does not perform the second transition and
- upon receiving an instruction to execute the second transition from a driver, the output control unit notifies the driver that the automatic brake hold function cannot be enabled.

According to this arrangement, in a system that exclusively executes the one-pedal function and the automatic brake hold function, the driver cannot execute the automatic brake hold function when the one-pedal function is enabled. This can prevent a situation in which when the driver releases the accelerator pedal, the one-pedal function is stopped, and no braking force is generated although it is required to generate the braking force, and can improve the safety.

In addition, since a message representing that the automatic brake hold function cannot be enabled is displayed, the driver can grasp the vehicle state, and it is possible to provide a sense of easiness that the automatic brake hold function has no fault.

[Arrangement 5]

There is provided a method of controlling a vehicle (100), wherein the vehicle includes:
- a traveling control unit (113) capable of executing stop hold control in at least two functions including an automatic brake hold function of, in a case in which the vehicle is stopped by depressing a brake pedal (152), holding a stop state of the vehicle without depending on an operation amount of the brake pedal and a one-pedal function of controlling both a driving force and a braking force of the vehicle in accordance with an operation amount of an accelerator pedal (150) and holding the stop state of the vehicle after the stop without depending on the operation amount of the brake pedal; and
- an output control unit (114) capable of displaying, on a display device (166) of the vehicle, a first indicator (302) indicating that the one-pedal function is enabled and a second indicator (303) indicating that the automatic brake hold function is enabled, and the method comprises:
- exclusively executing the automatic brake hold function and the one-pedal function, and
- executing at least one of
  - ending display of the second indicator and displaying the first indicator in a case in which a first transition of transitioning from a state in which the automatic brake hold function is enabled to a state in which the one-pedal function is enabled is performed, and/or ending display of the first indicator and displaying the second indicator in a case in which a second transition of transitioning from the state in which the one-pedal function is enabled to the state in which the automatic brake hold function is enabled is performed.

According to this arrangement, the same effect as in Arrangement 1 can be obtained.

[Arrangement 6]

There is provided a non-transitory computer-readable storage medium storing a program configured to cause a computer to function as each unit of a control device of any one of Arrangements 1 to 4.

According to this arrangement, the present invention can be provided in a form of a storage medium.

What is claimed is:

1. A control device configured to control a vehicle, the device comprising:

a traveling control unit capable of executing stop hold control in at least two functions including an automatic brake hold function of, in a case in which the vehicle is stopped by depressing a brake pedal, holding a stop state of the vehicle without depending on an operation amount of the brake pedal and a one-pedal function of controlling both a driving force and a braking force of the vehicle in accordance with an operation amount of an accelerator pedal and holding the stop state of the vehicle after the stop without depending on the operation amount of the brake pedal; and an output control unit capable of displaying, on a display device of the vehicle, a first indicator indicating that the one-pedal function is enabled and a second indicator indicating that the automatic brake hold function is enabled, wherein the traveling control unit exclusively executes the automatic brake hold function and the one-pedal function, and the output control unit executes at least one of ending display of the second indicator and displaying the first indicator in a case in which a first transition of transitioning from a state in which the automatic brake hold function is enabled to a state in which the one-pedal function is enabled is performed, and/or ending display of the first indicator and displaying the second indicator in a case in which a second transition of transitioning from the state in which the one-pedal function is enabled to the state in which the automatic brake hold function is enabled is performed.

2. The device according to claim 1, wherein the output control unit exclusively displays the first indicator and the second indicator in the same region of the display device.

3. The device according to claim 1, wherein the output control unit can further display, on the display device, a third indicator indicating that the stop state of the vehicle is held by the braking force of the one-pedal function, and a fourth indicator indicating that the stop state of the vehicle is held by the automatic brake hold function, the output control unit exclusively displays the third indicator and the fourth indicator in the same region of the display device, and the third indicator and the fourth indicator are the same mark.

4. The device according to claim 1, wherein the traveling control unit performs the first transition and does not perform the second transition and upon receiving an instruction to execute the second transition from a driver, the output control unit notifies the driver that the automatic brake hold function cannot be enabled.

5. A method of controlling a vehicle, wherein the vehicle includes:

a traveling control unit capable of executing stop hold control in at least two functions including an automatic brake hold function of, in a case in which the vehicle is stopped by depressing a brake pedal, holding a stop state of the vehicle without depending on an operation amount of the brake pedal and a one-pedal function of controlling both a driving force and a braking force of the vehicle in accordance with an operation amount of an accelerator pedal and holding the stop state of the vehicle after the stop without depending on the operation amount of the brake pedal; and an output control unit capable of displaying, on a display device of the vehicle, a first indicator indicating that the one-pedal function is enabled and a second indicator indicating that the automatic brake hold function is enabled, and the method comprises:

exclusively executing the automatic brake hold function and the one-pedal function, and executing at least one of ending display of the second indicator and displaying the first indicator in a case in which a first transition of transitioning from a state in which the automatic brake hold function is enabled to a state in which the one-pedal function is enabled is performed, and/or ending display of the first indicator and displaying the second indicator in a case in which a second transition of transitioning from the state in which the one-pedal function is enabled to the state in which the automatic brake hold function is enabled is performed.

6. A non-transitory computer-readable storage medium storing a program configured to cause a computer to function as each unit of a control device of claim 1.

* * * * *